(12) United States Patent
Iwasawa et al.

(10) Patent No.: US 6,992,835 B2
(45) Date of Patent: Jan. 31, 2006

(54) ZOOM LENS AND IMAGING DEVICE

(75) Inventors: Yoshito Iwasawa, Tokyo (JP);
Masafumi Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 10/889,060

(22) Filed: Jul. 13, 2004

(65) Prior Publication Data
US 2005/0036209 A1    Feb. 17, 2005

(30) Foreign Application Priority Data
Jul. 16, 2003    (JP) ............................. 2003-275122

(51) Int. Cl.
*G02B 15/14* (2006.01)
*H04N 5/262* (2006.01)

(52) U.S. Cl. .................. 359/682; 359/680; 348/240.3
(58) Field of Classification Search ............. 359/680, 359/682, 685; 348/240.3, 240.99
See application file for complete search history.

(56) References Cited

U.S. PATENT DOCUMENTS 5,900,987 A    5/1999 Kreitzer

2002/0191306 A1    12/2002 Toyama

FOREIGN PATENT DOCUMENTS

EP    1 220 002 A2    7/2002

OTHER PUBLICATIONS

PatentAbstracts of Japan, JP 2002-350726, Dec. 4, 2002.

*Primary Examiner*—David N. Spector
(74) *Attorney, Agent, or Firm*—Oblon, Spivak, McClelland, Maier & Neustadt, P.C.

(57) ABSTRACT

A zoom lens has an optical axis and includes: a negative first lens group capable of being moved for zooming and disposed nearest to the front end; a positive second lens group capable of being moved for zooming, and disposed behind the first lens group; and a positive third lens group disposed behind the second lens group. The zoom lens meets conditions expressed by inequalities:

$$0.02 < D12/fw < 0.13 \tag{1}$$

$$0.5 < D2G/fw < 0.95 \tag{2}$$

$$5 < TLW/fw < 8 \tag{3}$$

where D12 is a minimum distance on the optical axis between a back surface of the first lens group and a front surface of the second lens group, D2G is a distance between front and back surfaces of the second lens group, TLW is optical length of the zoom lens as set in the shortest focal length, and fw is the shortest focal length.

8 Claims, 16 Drawing Sheets

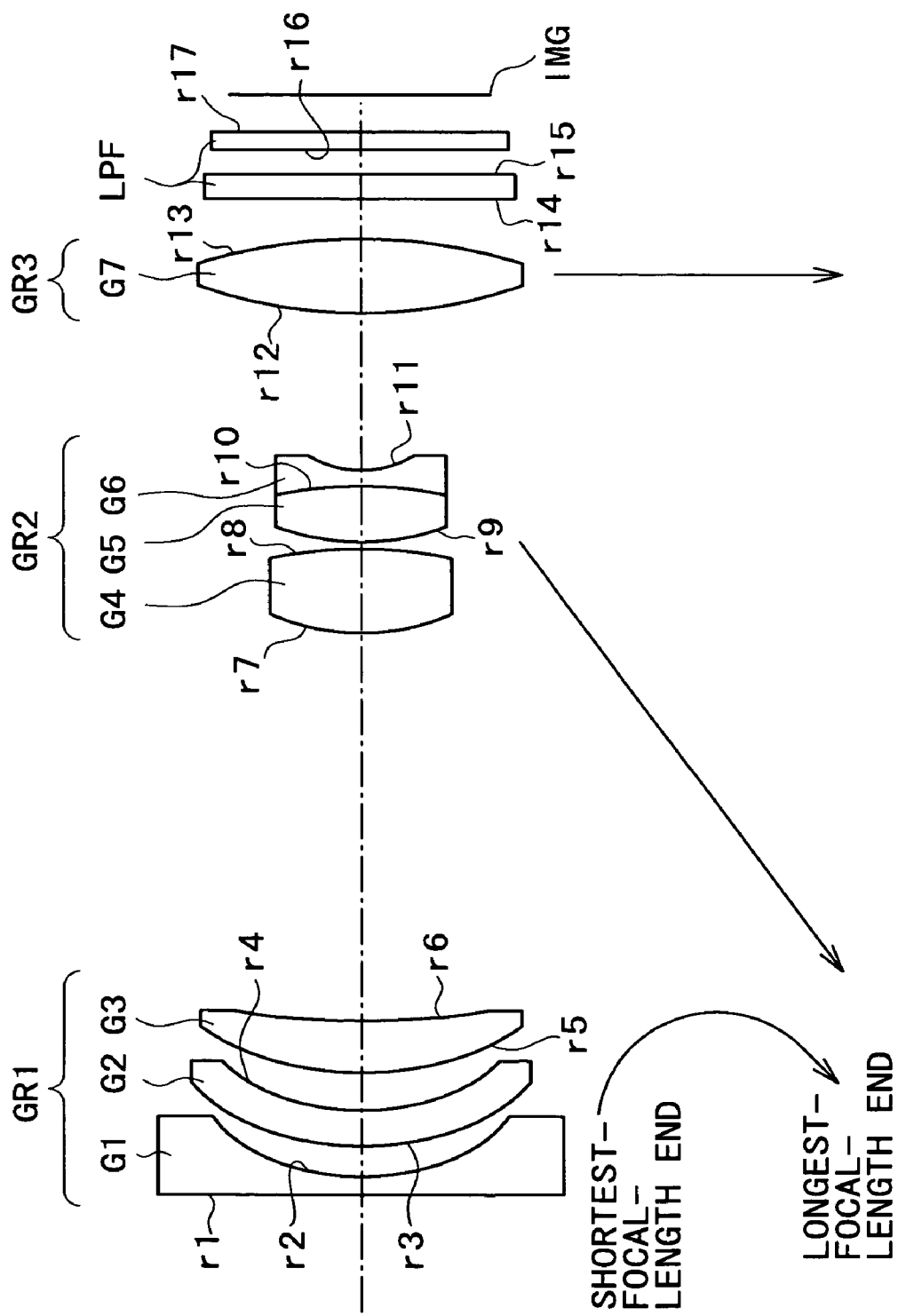

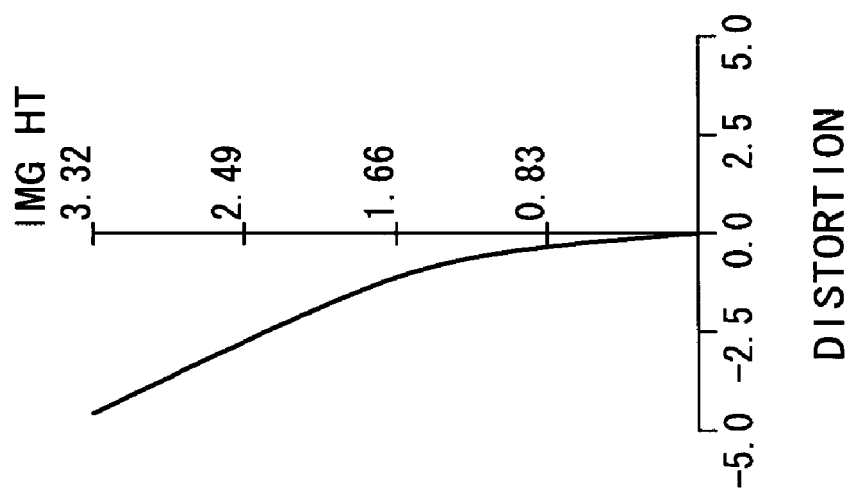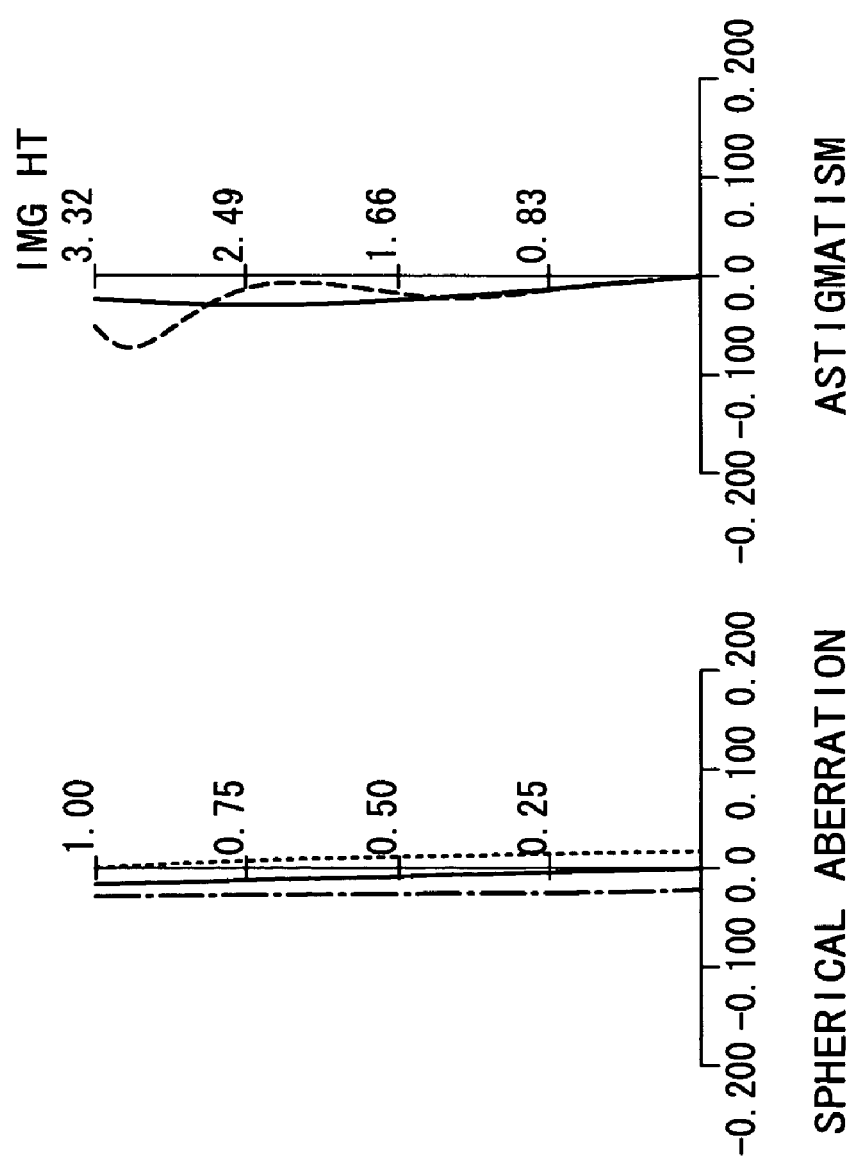

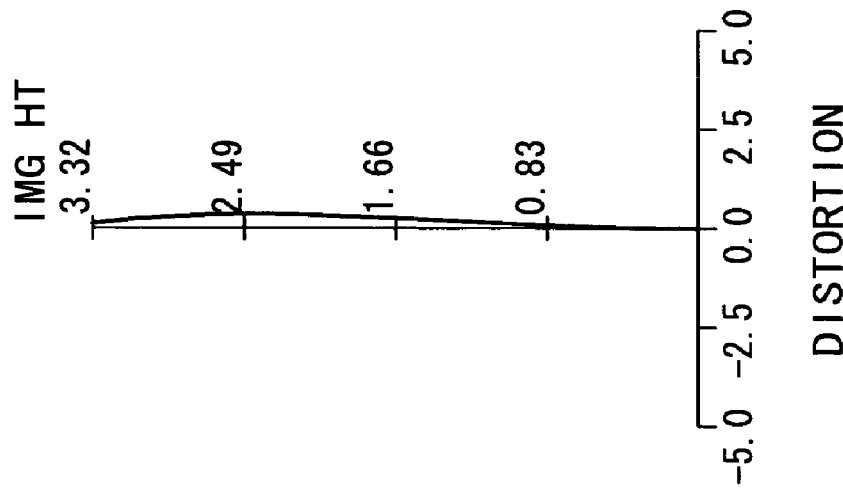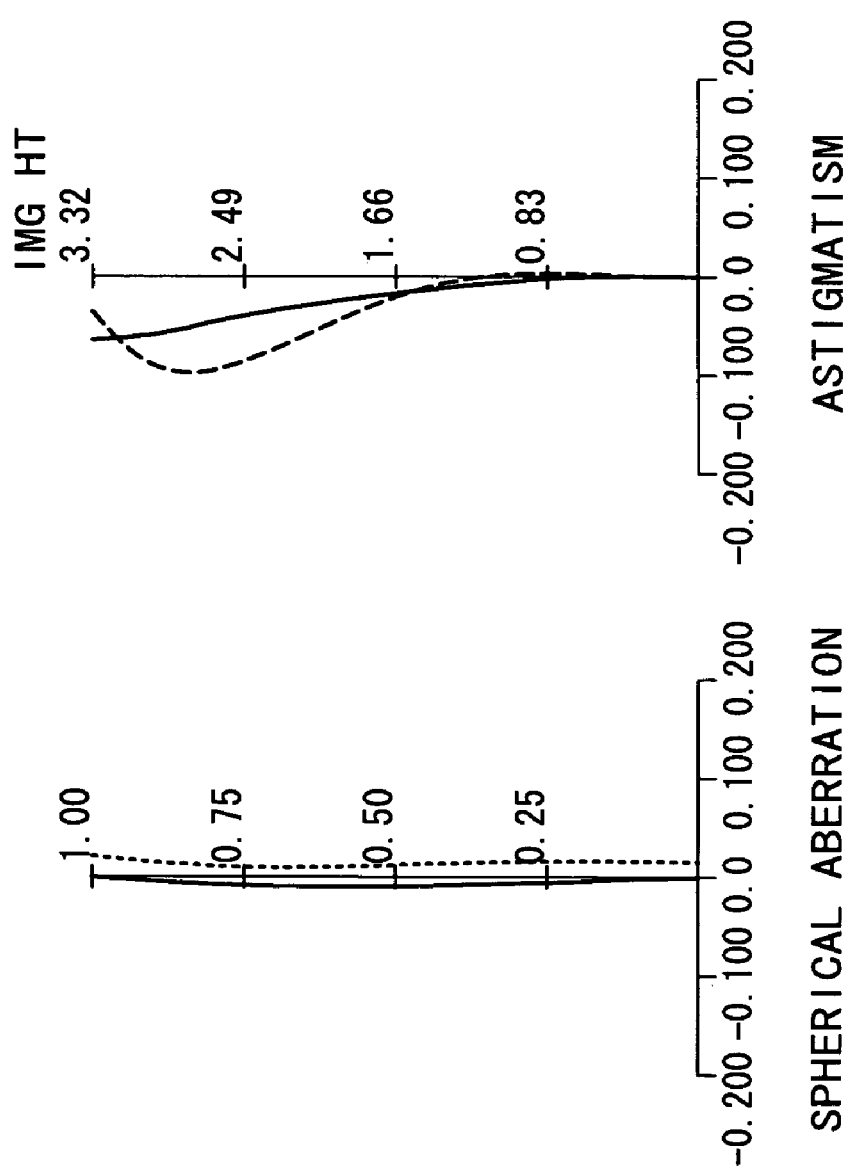

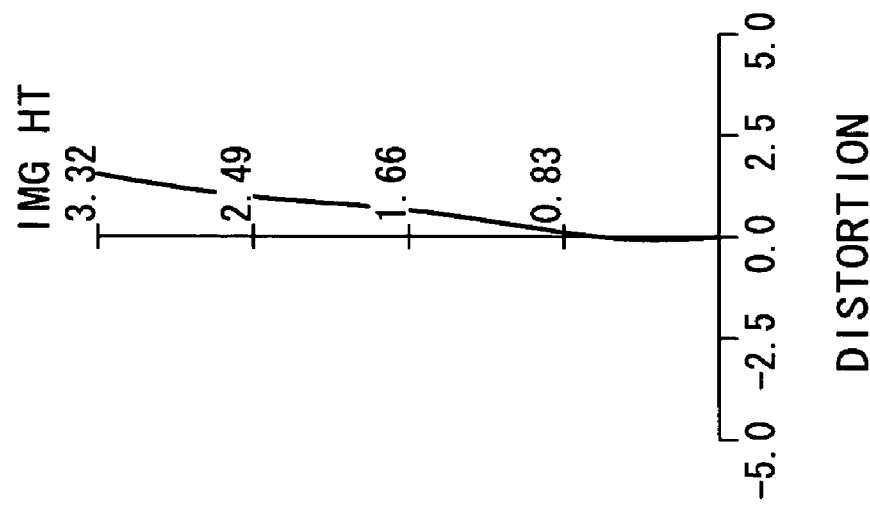
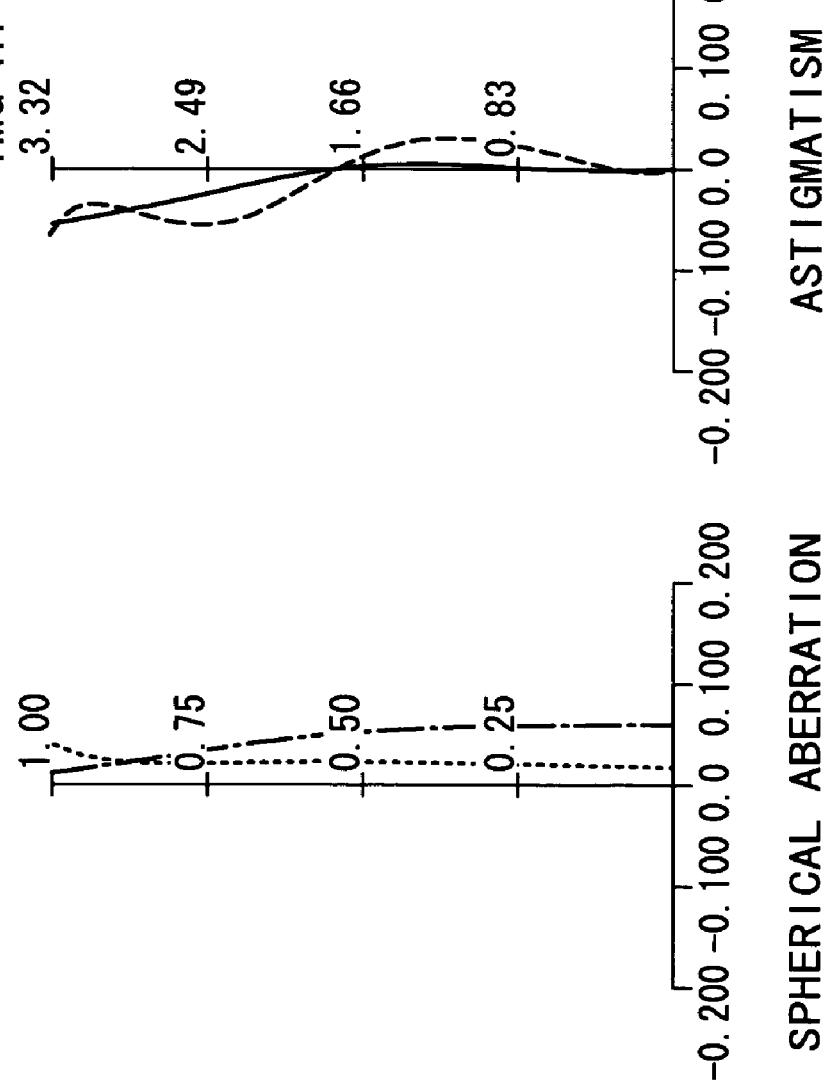

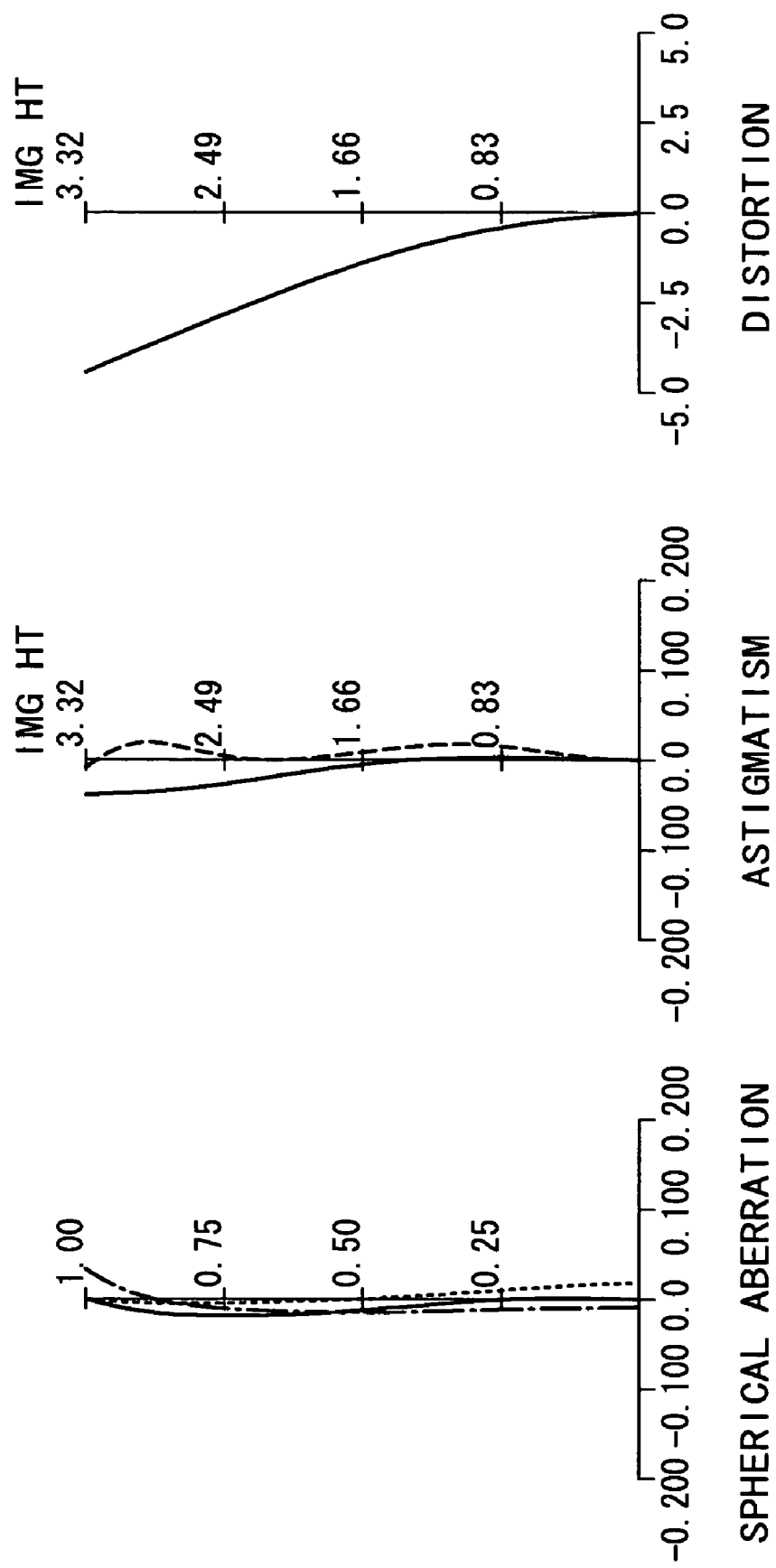

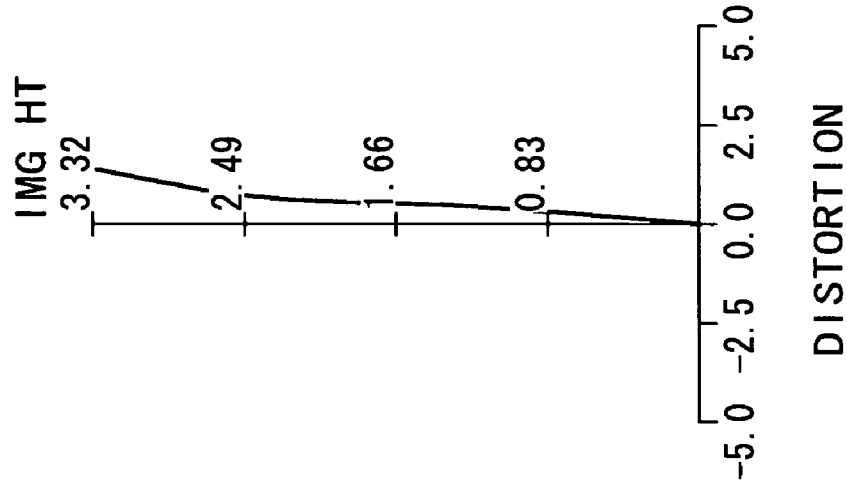
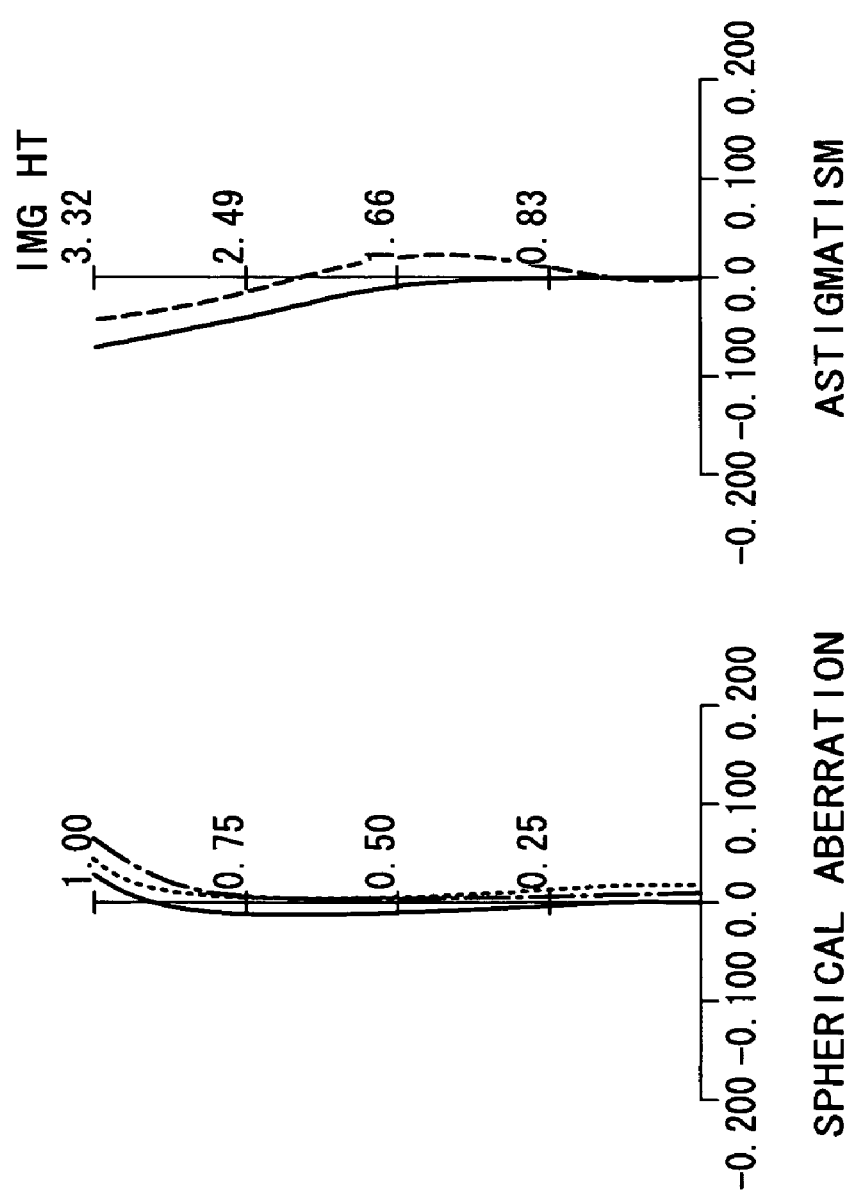

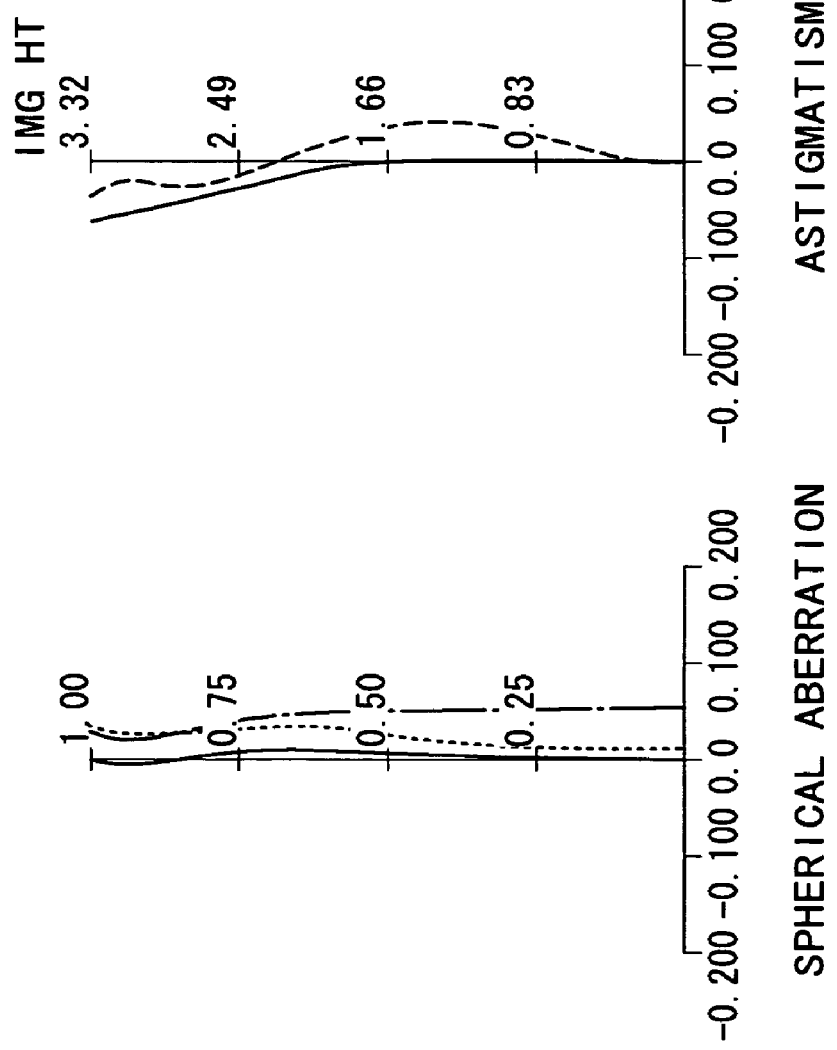

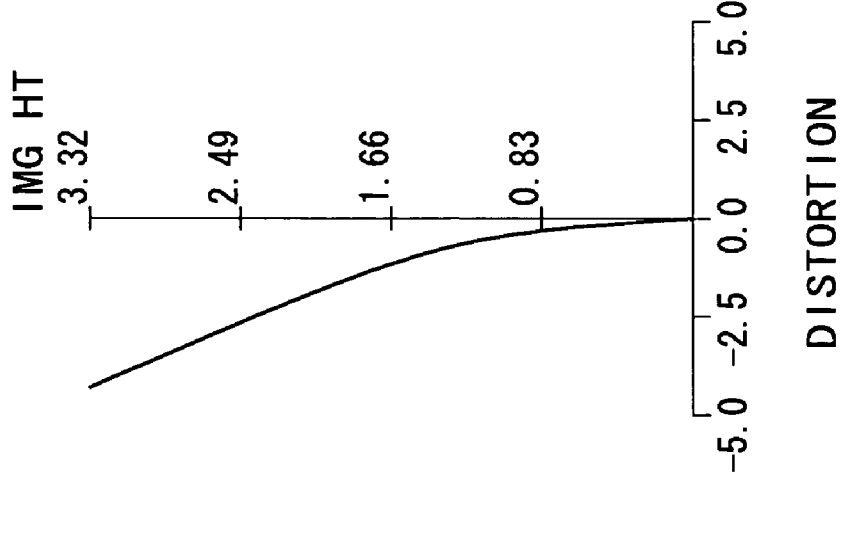
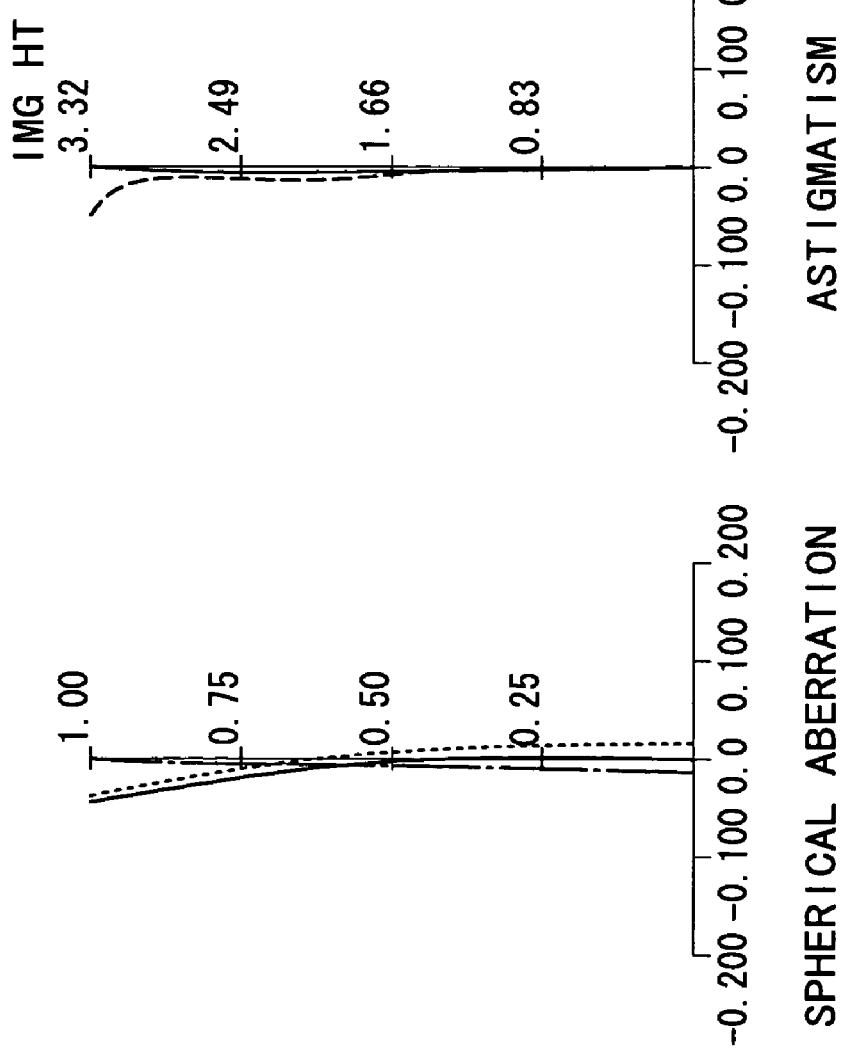

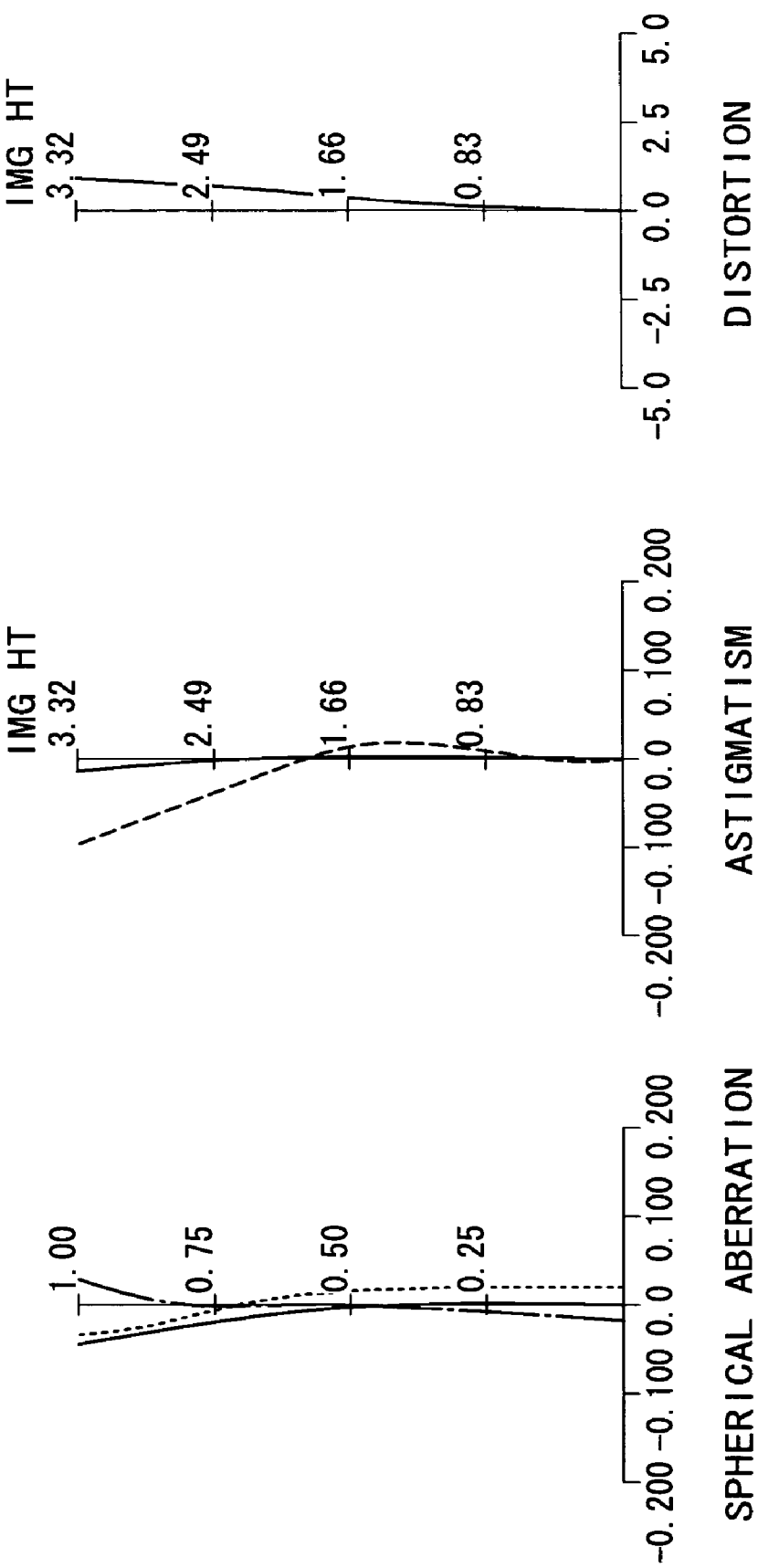

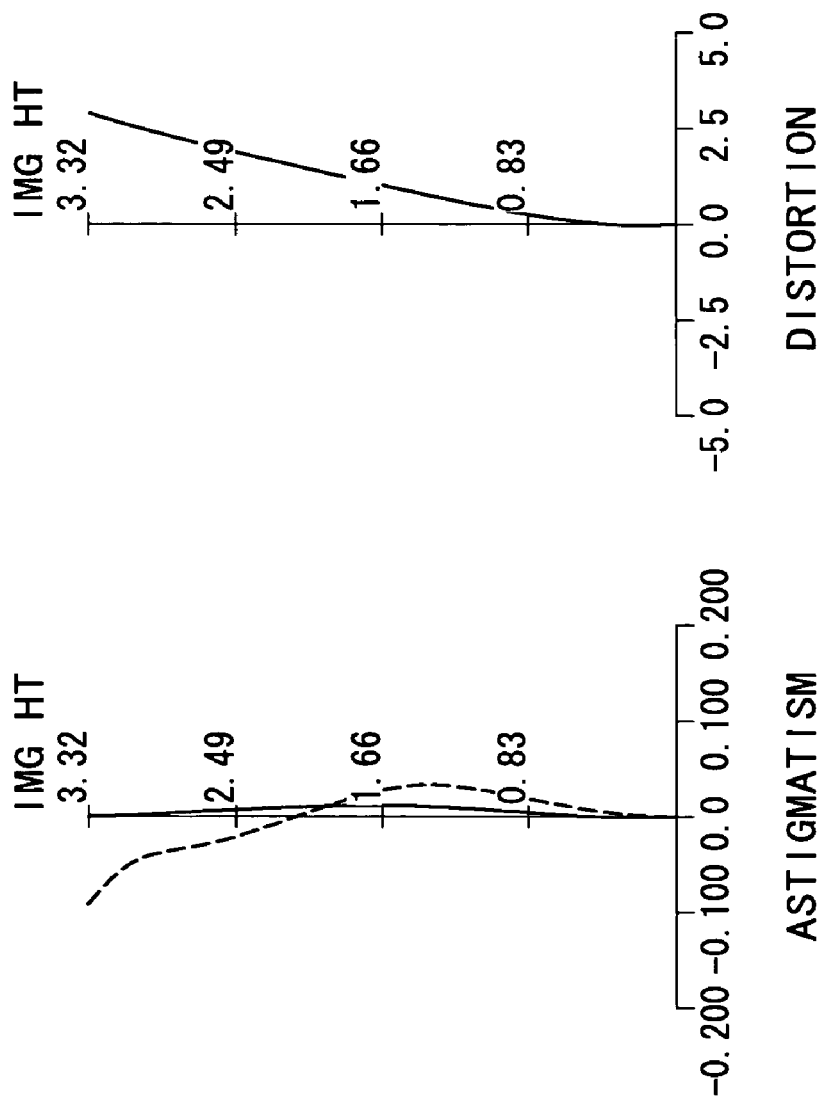

ZOOM LENS AND IMAGING DEVICE

BACKGROUND OF THE INVENTION

1. Field of the Invention

The present invention relates to an inexpensive, small zoom lens having a zoom ratio on the order of three, and an imaging device provided with the zoom lens.

2. Description of the Related Art

Digital still cameras, i.e., imaging devices provided with a solid-state image sensor, have come into wide use in recent years. The wide spread of digital still cameras is accompanied by demand for the further improvement of picture quality. Digital still cameras provided with a solid-state image sensor having a large number of picture elements need a photographic lens, particularly, a zoom lens, having an excellent focusing ability suitable for use in combination with the solid-state image sensor having a large number of picture elements. There has been strong demand for the miniaturization and const reduction of lenses, and the development of inexpensive, small, high-performance zoom lenses.

A zoom lens having a focusing ability suitable for use in combination with a solid-sate image sensor having a large number of picture elements is disclosed in JP-A No. 2002-350726. This known zoom lens is a three-lens-group zoom lens having a negative first lens group, a positive second lens group and a positive third lens group arranged in that order from the object side toward the image side.

Such a zoom lens is long as compared with its focal length and the lens groups are not satisfactorily miniaturized. Therefore, this lens cannot be collapsed in a satisfactorily small size. Since the interval between the first lens group and the second lens group is not optimized, there is a difficulty in forming the zoom lens in a short length, and the second lens group is inevitably large because an aperture stop is disposed between the lenses of the second lens group. The large second lens group makes collapsing the zoom lens in a small size difficult. Moreover, it is difficult to reduce the cost of this zoom lens.

SUMMARY OF THE INVENTION

The present invention has been made in view of such problems in the prior art zoom lens and it is therefore an object of the present invention to provide a zoom lens not having the foregoing problems.

Another object of the present invention is to provide an imaging device provided with the zoom lens according to the present invention.

According to the present invention, a zoom lens having an optical axis includes: a negative first lens group capable of being moved for zooming and disposed at the front end; a positive second lens group capable of being moved for zooming, and disposed behind the first lens group; and a positive third lens group disposed behind the second lens group; wherein the zoom lens meets conditions expressed by inequalities:

$$0.02 < D12/fw < 0.13 \quad (1)$$

$$0.5 < D2G/fw < 0.95 \quad (2)$$

$$5 < TLW/fw < 8 \quad (3)$$

where D12 is a minimum distance on the optical axis between the back surface of the first lens group and the front surface of the second lens group, D2G is the distance between the front and the back surface of the second lens group, TLW is the optical length of the zoom lens as set in the shortest focal length, and fw is the shortest focal length.

According to the present invention, an imaging device includes the zoom lens according to the present invention, and an image sensor capable of converting an optical image formed by the zoon lens into corresponding electric signals.

Inequality (1) defines the interval between the first and the second lens group, Inequality (2) defines the total length of the second lens group, and Inequality (3) defines the optical length of the zoom lens. The zoom lens according to the present invention has compact construction and can be manufactured at a low cost.

The present invention is effective in improving the focusing ability of a zoom lens having a zoom ratio in the range of two to three, in miniaturizing the zoom lens and in reducing the cost of the zoom lens.

BRIEF DESCRIPTION OF THE DRAWINGS

The above and other objects, features and advantages of the present invention will become more apparent from the following description taken in connection with the accompanying drawings; in which:

FIG. 1 is a typical sectional view of a zoom lens in a first embodiment according to the present invention;

FIG. 2 is a diagram showing aberrations caused by the zoom lens shown in FIG. 1 set in the shortest focal length;

FIG. 3 is a diagram showing aberrations caused by the zoom lens shown in FIG. 1 set in a middle focal length;

FIG. 4 is a diagram showing aberrations caused by the zoom lens shown in FIG. 1 set in the longest focal length;

FIG. 6 is a diagram showing aberrations caused by the zoom lens shown in FIG. 5 set in the shortest focal length;

FIG. 7 is a diagram showing aberrations caused by the zoom lens shown in FIG. 5 set in a middle focal length;

FIG. 8 is a diagram showing aberrations caused by the zoom lens shown in FIG. 5 set in the longest focal length;

FIG. 14 is a diagram showing aberrations caused by the zoom lens shown in FIG. 13 set in the shortest focal length;

FIG. 15 is a diagram showing aberrations caused by the zoom lens shown in FIG. 13 set in a middle focal length; and FIG. 16 is a diagram showing aberrations caused by the zoom lens shown in FIG. 13 set in the longest focal length.

DESCRIPTION OF THE PREFERRED EMBODIMENTS

Figure 5:
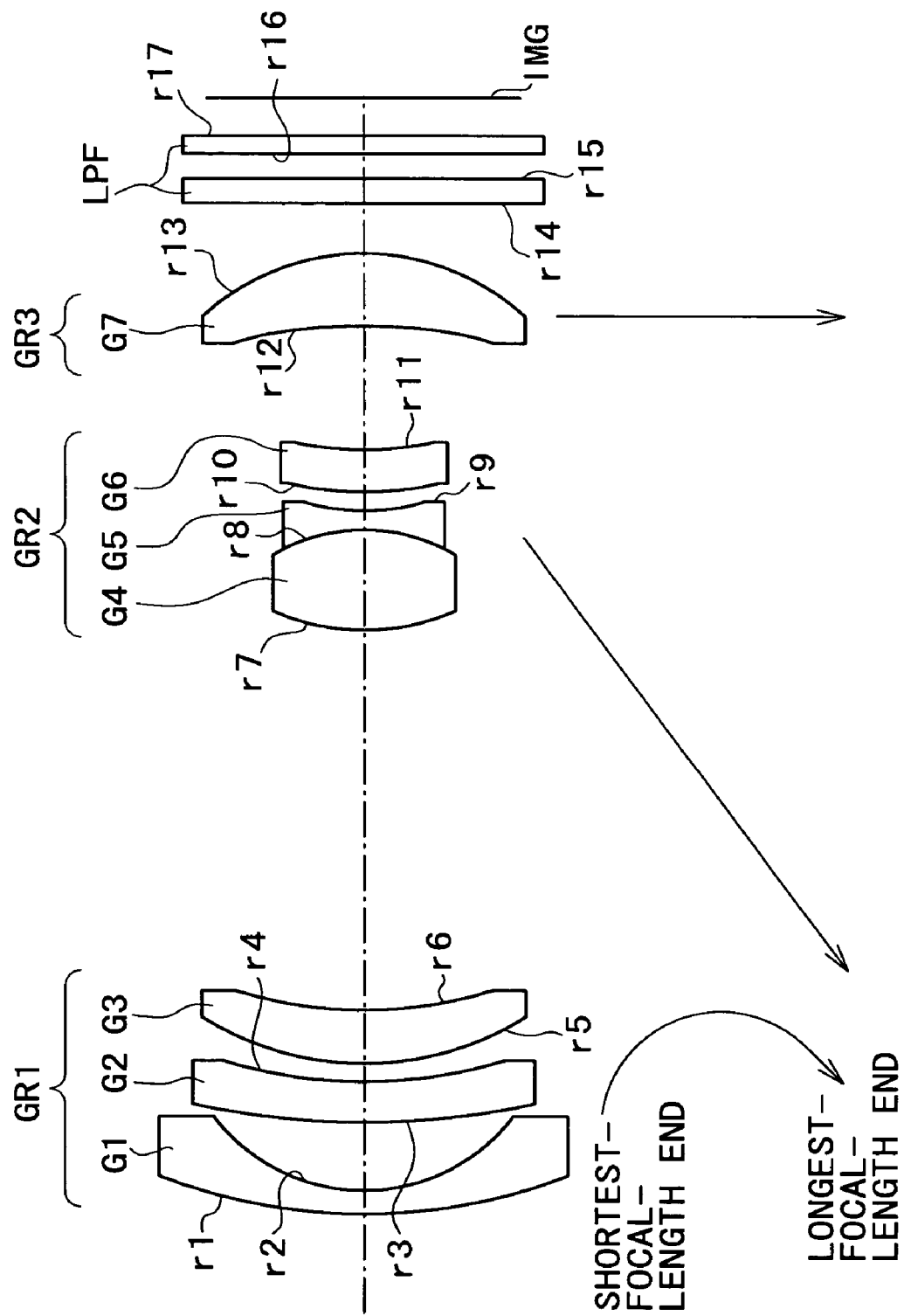
FIG. 5 is a typical sectional view of a zoom lens in a second embodiment according to the present invention.

A zoom lens according to the present invention will be described with reference to FIG. 1. The zoom lens has a negative first lens group GR1, a positive second lens group GR2 and a third lens group GR3 arranged in that order from an object side toward an image side. The first lens group GR1 and the second lens group GR2 are moved for zooming. The zoom lens meets conditions expressed by following inequalities:

$$0.02 < D12/fw < 0.13 \quad (1)$$

$$0.5 < D2G/fw < 0.95 \quad (2)$$

$$5 < TLW/fw < 8 \quad (3)$$

Where D12 is a minimum distance on the optical axis between the back end surface of the first lens group GR1 and the front end surface of the second lens group GR2, D2G is the distance between the front and the back surface of the second lens group GR2, TLW is the optical length of the zoom lens as set in the shortest focal length, and fw is the shortest focal length.

Preferably, the zoom lens includes at least one plastic lens. The plastic lens reduces the weight of the zoom lens and a plastic lens having an aspheric surface for aberration correction is easier to form than an equivalent glass lens.

The first lens group GR1 of the zoom lens consists of three lenses, namely, a first single lens G1 having a negative refracting power, a second single lens G2 having a negative refracting power and formed of a plastic material, and a third single lens G3 having a positive refracting power. Preferably, at least one of the surfaces of the second single lens G2 is aspheric.

A shading member, not shown, is disposed between the second lens group GR2 and the third lens group GR3 to reduce the intensity of light reaching an image sensor IMG while the image sensor IMG reads an image signal. Preferably, the zoom lens meets a condition expressed by:

$$0.5 < D23/fw < 1.1 \quad (4)$$

Where D23 is the shortest distance between the back surface of the second lens group GR2 and the front surface of the third lens group GR3, and fw is the shortest focal length of the zoom lens. Desirably, the shading member is a vari-able-transmittance shade device capable of adjusting the intensity of light reaching the image sensor.

Conditions expressed by the foregoing inequalities will be explained. Inequality (1) defines the interval D12 between the first lens group GR1 and the second lens group GR2. Although it is desirable to reduce the interval D12 between the first lens group GR1 and the second lens group GR2 as far as possible to reduce the overall optical length of the zoom lens, the first lens group GR1 and the second lens group GR2 physically interfere with each other if the value of D12/fw is not greater than 0.02, namely, the lower limit. It is difficult to advance the principal point of the second lens group GR2 and to reduce the overall optical length of the zoom lens if the value of D12/fw is greater than 0.13, namely, the upper limit. The overall optical length of the zoom lens can be reduced when Inequality (1) is satisfied. Preferably, the upper limit in Inequality (1) is 0.06 instead of 0.13 to miniaturize the front lens group, namely, the first lens group GR1.

Inequality (2) defines the overall length of the second lens group GR2. Although it is desirable to form each of the lens groups GR1, GR2 and GR3 in the least possible thickness to reduce the length of the collapsed zoom lens, it is difficult to correct spherical aberration and a peripheral coma caused by the second lens group GR2, the performance of the zoom lens is deteriorated significantly, and the zoom lens needs to be assembled very accurately if the value of D2G/fw is smaller than 0.5, namely, the lower limit. The thickness of the second lens group GR2 is big and the zoom lens cannot be compactly collapsed if the value of D2G/fw is greater than 0.95, namely, the upper limit. When the zoom lens satisfies Inequality (2), aberrations can be satisfactorily corrected, the assembling accuracy of the zoom lens can be improved and the zoom lens is compact.

Inequality (3) defines the overall optical length of the zoom lens. It is difficult to correct spherical aberration and a peripheral coma caused by the zoom lens the performance of the zoom lens is deteriorated significantly and the zoom lens needs to be assembled very accurately if the value of TLW/fw is smaller than 5, namely, the lower limit. The overall length of the zoom lens increases, the number of lens barrels needs to be increased to collapse the zoom lens compactly, the outermost lens barrel has a large diameter, and the zoom lens cannot be compactly collapsed when the number of the lens barrel is small if the value of TLW/fw is greater than 8, namely, the upper limit. When the zoom lens satisfies Inequality (3), aberrations can be satisfactorily corrected, the assembling accuracy of the zoom lens can be improved and the zoom lens is compact.

Inequality (4) defines the interval D23 between the second lens group GR2 and the third lens group GR3 to interpose a shading member between the second lens group GR2 and the third lens group GR3 to reduce the intensity of light reaching the image sensor IMG while the image sensor IMG reads an image signal. It is difficult to interpose the shading member between the second lens group GR2 and the third lens group GR3 if the value of D23/fw is smaller than 0.5, namely, the lower limit. The overall length of the zoom lens increase and it is difficult to miniaturize the zoom lens if the value of D23/fw is greater than 1.1, namely, the upper limit. The shading member can be disposed between the second lens group GR2 and the third lens group GR3 and the zoom lens is compact when the zoom lens satisfies Inequality (4).

First Embodiment

A zoom lens in a first embodiment according to the present invention shown in FIG. 1 has a negative first lens group GR1, a positive second lens group GR2 and a third lens group GR3 arranged in that order from an object side toward an image side. The first lens group GR1 includes a negative first single lens G1 having a surface having a large curvature and concave toward the image side, a negative second lens G2 having opposite aspheric surfaces and formed of a plastic material, and a positive third lens G3. The second lens group GR2 includes a positive single lens G4 formed of a plastic material, and a compound lens G5/G6 formed by bonding together a positive single lens G5 and a negative single lens G6. The third lens group GR3 includes a positive single lens G7 having opposite aspheric surfaces and formed of a plastic material.

FIGS. 2A, 2B and 2C show spherical aberration, astigmatism and distortion, respectively, caused by the zoom lens in the first embodiment set in the shortest focal length. FIGS. 3A, 3B and 3C show spherical aberration, astigmatism and distortion, respectively, caused by the zoom lens in the first embodiment set in a middle shortest focal length. FIGS. 4A, 4B and 4C show spherical aberration, astigmatism and distortion, respectively, caused by the zoom lens in the first embodiment set in the longest focal length. In FIGS. 2A, 3A and 4A, the ratio of spherical aberration to F-number is measured on the vertical axis, deviation from an accurate focus is measured on the horizontal axis, and a continuous line, a broken line and a chain line are for the D line, the C line and the G line, respectively. In FIGS. 2B, 3B and 4B, image height is measured on the vertical axis, focus is measured on the horizontal axis, a continuous line indicates a sagittal image surface, and a broken line indicates a meridional image surface. In FIGS. 2C, 3C and 4C, image height is measured on the vertical axis, and distortion percentage is measured on the horizontal axis.

Table 1 shows data on the zoom lens in the first embodiment.

TABLE 1

Data on Zoom Lens
FNo. = 2.85–3.71–5.17
f = 5.25–8.84–14.86
ω = 33.53–20.57–12.42

| Surface No. | R | D | ND | vd |
|---|---|---|---|---|
| 1: | 620.453 | 0.550 | 1.69680 | 55.500 |
| 2: | 5.500 | 0.847 | | |
| 3: | 9.271 (ASP) | 1.000 | 1.52470 | 56.236 |
| 4: | 5.835 (ASP) | 1.000 | | |
| 5: | 8.224 | 1.368 | 1.80610 | 33.300 |
| 6: | 26.403 | 10.681–4.290–0.500 | | |
| 7: | 5.967 (ASP) | 2.248 | 1.52470 | 56.236 |
| 8: | −14.376 (ASP) | 0.200 | | |
| 9: | 5.554 | 1.487 | 1.83400 | 37.300 |
| 10: | −15.338 | 0.500 | 1.78472 | 25.700 |
| 11: | 3.183 | 4.241–8.031–14.427 | | |
| 12: | 12.692 (ASP) | 1.983 | 1.52470 | 56.236 |
| 13: | −15.994 (ASP) | 1.100 | | |
| 14: | INFINITY | 0.700 | 1.44524 | 27.700 |
| 15: | INFINITY | 0.600 | | |
| 16: | INFINITY | 0.500 | 1.56883 | 56.000 |
| 17: | INFINITY | | | |

| Surface No. | κ | $A^4$ | $A^6$ | $A^8$ | $A^{10}$ |
|---|---|---|---|---|---|
| 3 | 1 | 0.103034E−02 | −0.788083E−04 | 0.696294E−05 | −0.147155E−06 |
| 4 | 1 | −0.417851E−03 | −0.968635E−04 | 0.815844E−05 | −0.241075E−06 |
| 7 | 1 | −0.917554E−03 | 0.615719E−06 | −0.755999E−05 | 0.912229E−06 |
| 8 | 1 | −0.376849E−04 | 0.168281E−04 | −0.868074E−05 | 0.120926E−05 |
| 12 | 1 | −0.901211E−03 | 0.113451E−03 | −0.778351E−05 | 0.190649E−06 |
| 13 | 1 | −0.432058E−03 | 0.666450E−04 | −0.444144E−05 | 0.103362E−06 |

In Table 1, FNo. denotes F-number, f denotes focal length, ω denotes half field angle, R denotes radius of curvature, D denotes distance between lens surfaces, ND denotes refractive index for the D line, and vd denotes Abbe's number. Surfaces with "(ASP)" are aspheric surfaces. The shape of the aspheric surface is expressed by Expression (1).

$$x = \frac{y^2 \cdot c^2}{1 + \sqrt{1 - k \cdot y^2 \cdot c^2}} + \sum A^i \cdot Y^i \quad (1)$$

Where:

X: Distance from the apex of the lens surface on the optical axis

Y: Height in a plane perpendicular to the optical axis

C: Paraxial curvature $A^i$: Aspherical coefficient of i-degree

Second Embodiment

FIG. 5 shows the construction of a zoom lens in a second embodiment according to the present invention. Referring to FIG. 5, the zoom lens has a negative first lens group GR1, a positive second lens group GR2 and a positive third lens group GR3 arranged in that order from an object side toward an image side. The first lens group GR1 includes a negative first single lens G1 having a surface having a large curvature and concave toward the image side, a negative second lens G2 having opposite aspheric surfaces and formed of a plastic material, and a positive third lens G3. The second lens group GR2 includes a compound lens G4/G5 formed by bonding together a positive single lens G4 and a negative single lens G5, and a positive single lens G6 having opposite aspheric surfaces and formed of a plastic material. The third lens group GR3 includes a positive single lens G7 having opposite aspheric surfaces and formed of a plastic material. The use of the positive single lens G6 having opposite aspheric surfaces and formed of a plastic material as a lens nearest to the image plane provides a margin for the accuracy of the aspheric surfaces.

FIGS. 6A, 6B and 6C show spherical aberration, astigmatism and distortion, respectively, caused by the zoom lens in the second embodiment set in the shortest focal length. FIGS. 7A, 7B and 7C show spherical aberration, astigmatism and distortion, respectively, caused by the zoom lens in the second embodiment set in a middle shortest focal length. FIGS. 8A, 8B and 8C show spherical aberration, astigmatism and distortion, respectively, caused by the zoom lens in the second embodiment set in the longest focal length. In FIGS. 6A, 7A and 8A, the ratio of spherical aberration to F-number is measured on the vertical axis, deviation from an accurate focus is measured on the horizontal axis, and a continuous line, a broken line and a chain line are for the D line, the C line and the G line, respectively. In FIGS. 6B, 7B and 8B, image height is measured on the vertical axis, focus is measured on the horizontal axis, a continuous line indicates a sagittal image surface, and a broken line indicates a meridional image surface. In FIGS. 6C, 7C and 8C, image height is measured on the vertical axis, and distortion percentage is measured on the horizontal axis.

Table 2 shows data on the zoom lens in the second embodiment.

TABLE 2

Data on Zoom Lens
FNo. = 2.85–3.71–5.17
f = 5.25–8.82–14.86
ω = 33.55–20.39–12.28

| Surface No. | R | D | ND | vd |
|---|---|---|---|---|
| 1: | 14.773 | 0.550 | 1.72916 | 54.700 |
| 2: | 4.689 | 1.900 | | |
| 3: | 17.228 (ASP) | 1.000 | 1.52470 | 56.236 |
| 4: | 9.178 (ASP) | 0.554 | | |
| 5: | 7.957 | 1.439 | 1.84666 | 23.800 |
| 6: | 12.476 | 10.010–4.074–0.526 | | |
| 7: | 4.329 | 2.248 | 1.72916 | 54.700 |
| 8: | −5.737 | 0.500 | 1.67270 | 32.300 |
| 9: | 5.266 | 0.500 | | |
| 10: | 4.500 (ASP) | 1.100 | 1.52470 | 56.236 |
| 11: | 5.951 (ASP) | 3.397–6.712–12.319 | | |
| 12: | −24.533 (ASP) | 2.000 | 1.52470 | 56.236 |
| 13: | −6.401 (ASP) | 1.300 | | |
| 14: | INFINITY | 0.700 | 1.51680 | 64.200 |
| 15: | INFINITY | 0.600 | | |
| 16: | INFINITY | 0.500 | 1.56883 | 56.000 |
| 17: | INFINITY | | | |

| Surface No. | κ | $A^4$ | $A^6$ | $A^8$ | $A^{10}$ |
|---|---|---|---|---|---|
| 3 | 1 | −0.493997E−03 | 0.308542E−04 | −0.203091E−05 | 0.480038E−07 |
| 4 | 1 | −0.100405E−02 | 0.496204E−05 | −0.970592E−06 | −0.250497E−07 |
| 10 | 1 | −0.501639E−02 | −0.981536E−03 | −0.400770E−04 | −0.124102E−04 |
| 11 | 1 | 0.861527E−03 | −0.675163E−03 | −0.798500E−04 | 0.940314E−05 |
| 12 | 1 | −0.163206E−02 | −0.237511E−04 | 0.441858E−05 | −0.199791E−06 |
| 13 | 1 | −0.114059E−03 | −0.852311E−04 | 0.828581E−05 | −0.254497E−06 |

In Table 2, FNo. denotes F-number, f denotes focal length, ω denotes half field angle, R denotes radius of curvature, D denotes distance between lens surfaces, ND denotes refractive index for the D line, and vd denotes Abbe's number. Surfaces with "(ASP)" are aspheric surfaces. The shape of the aspheric surface is expressed by Expression (1).

Third Embodiment

Figure 9:
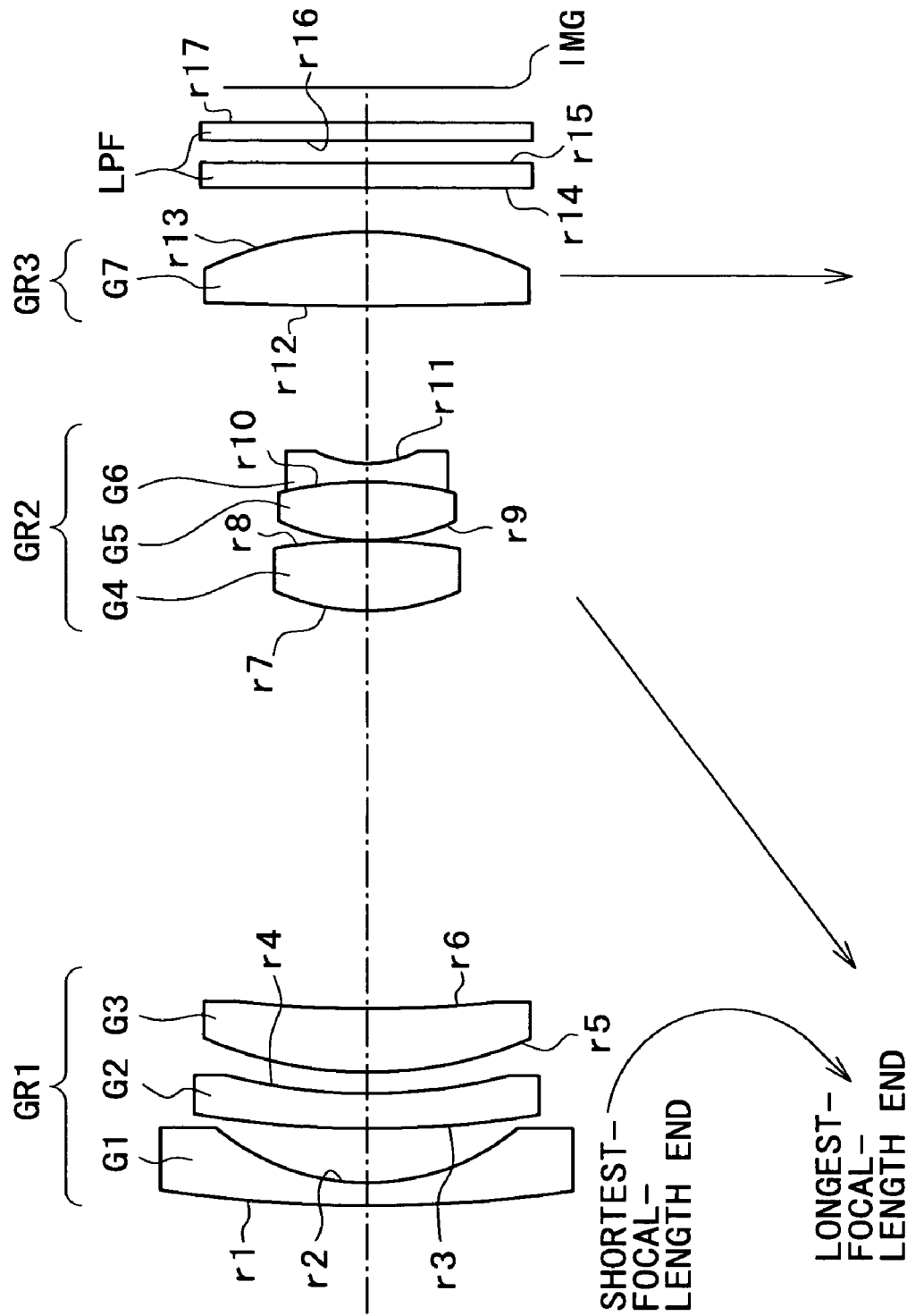
FIG. 9 is a typical sectional view of a zoom lens in a third embodiment according to the present invention.

FIG. 9 shows the construction of a zoom lens in a third embodiment according to the present invention. Referring to FIG. 9, the zoom lens has a negative first lens group GR1, a positive second lens group GR2 and a positive third lens group GR3 arranged in that order from an object side toward an image side. The first lens group GR1 includes a negative first single lens G1 having a surface having a large curvature and concave toward the image side, a negative second single lens G2 having opposite aspheric surfaces and formed of a plastic material, and a positive third single lens G3. The second lens group GR2 includes a positive single lens G4 having opposite aspheric surfaces and formed of a plastic material, and a compound lens G5/G6 formed by bonding together a positive single lens G5 and a negative single lens G6. The third lens group GR3 includes a positive single lens G7 having an aspheric surface facing the object side.

Figure 10:
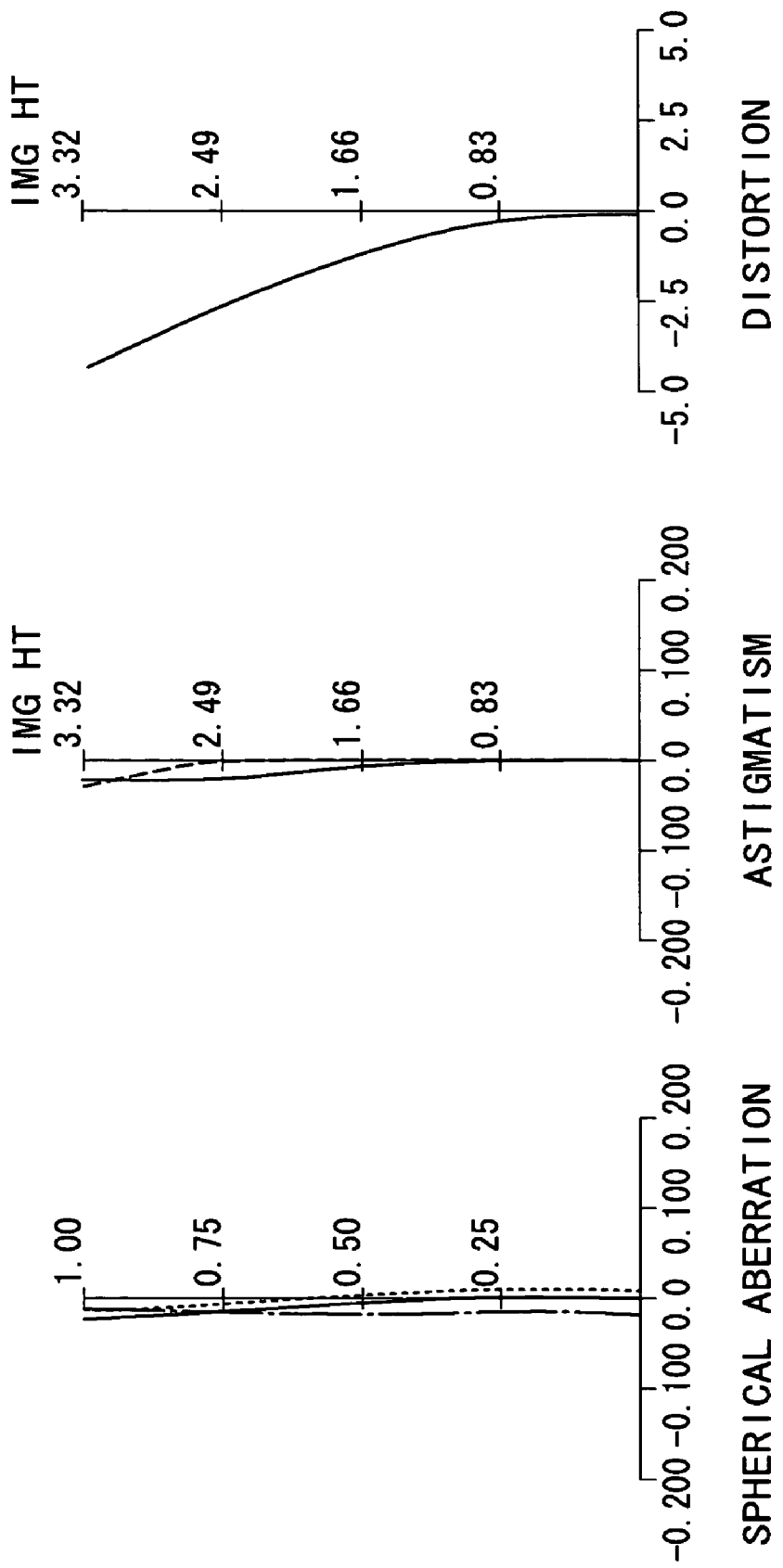
FIG. 10 is a diagram showing aberrations caused by the zoom lens shown in FIG. 9 set in the shortest focal length.
Figure 11:
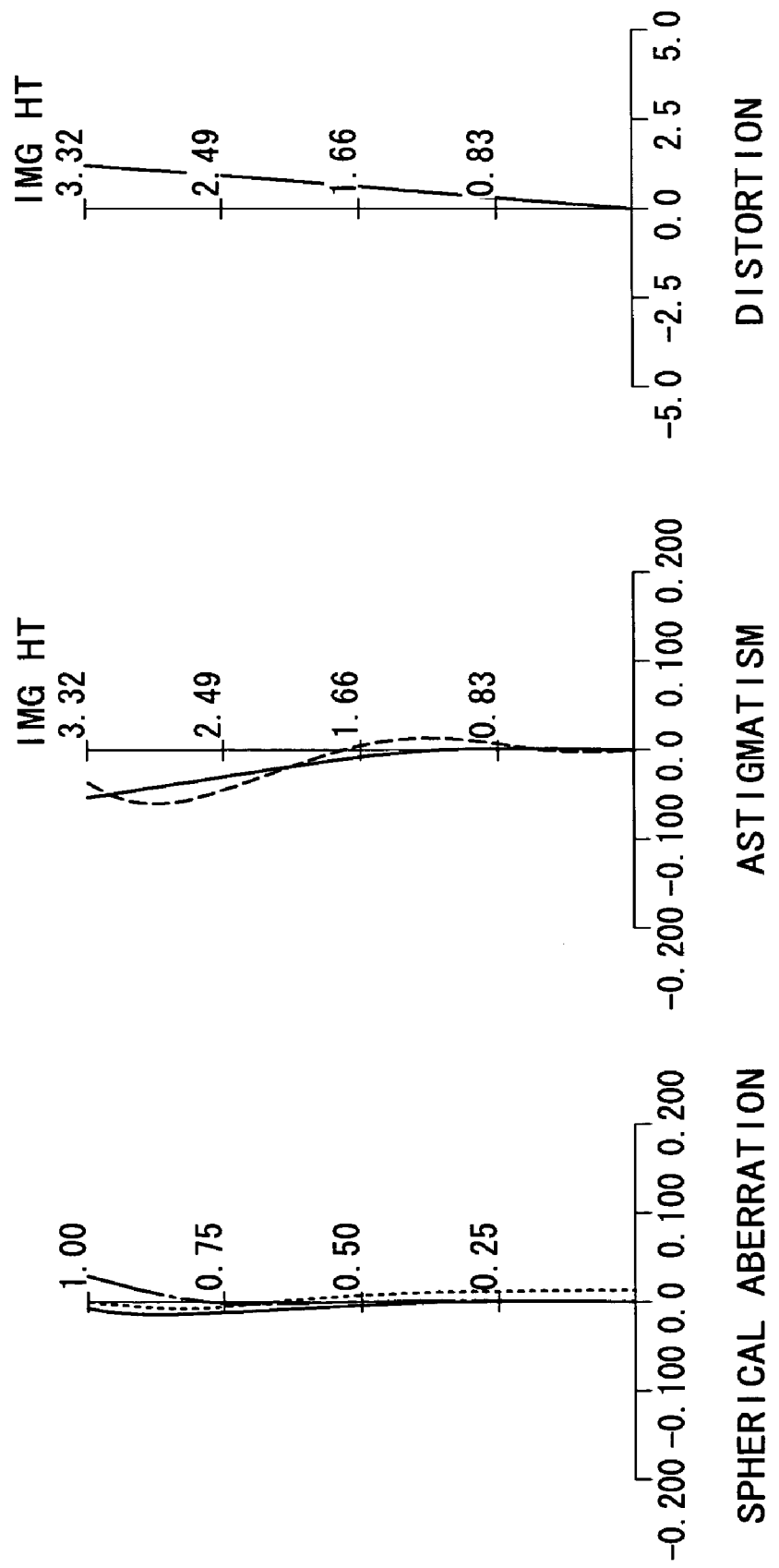
FIG. 11 is a diagram showing aberrations caused by the zoom lens shown in FIG. 9 set in a middle focal length.
Figure 12:
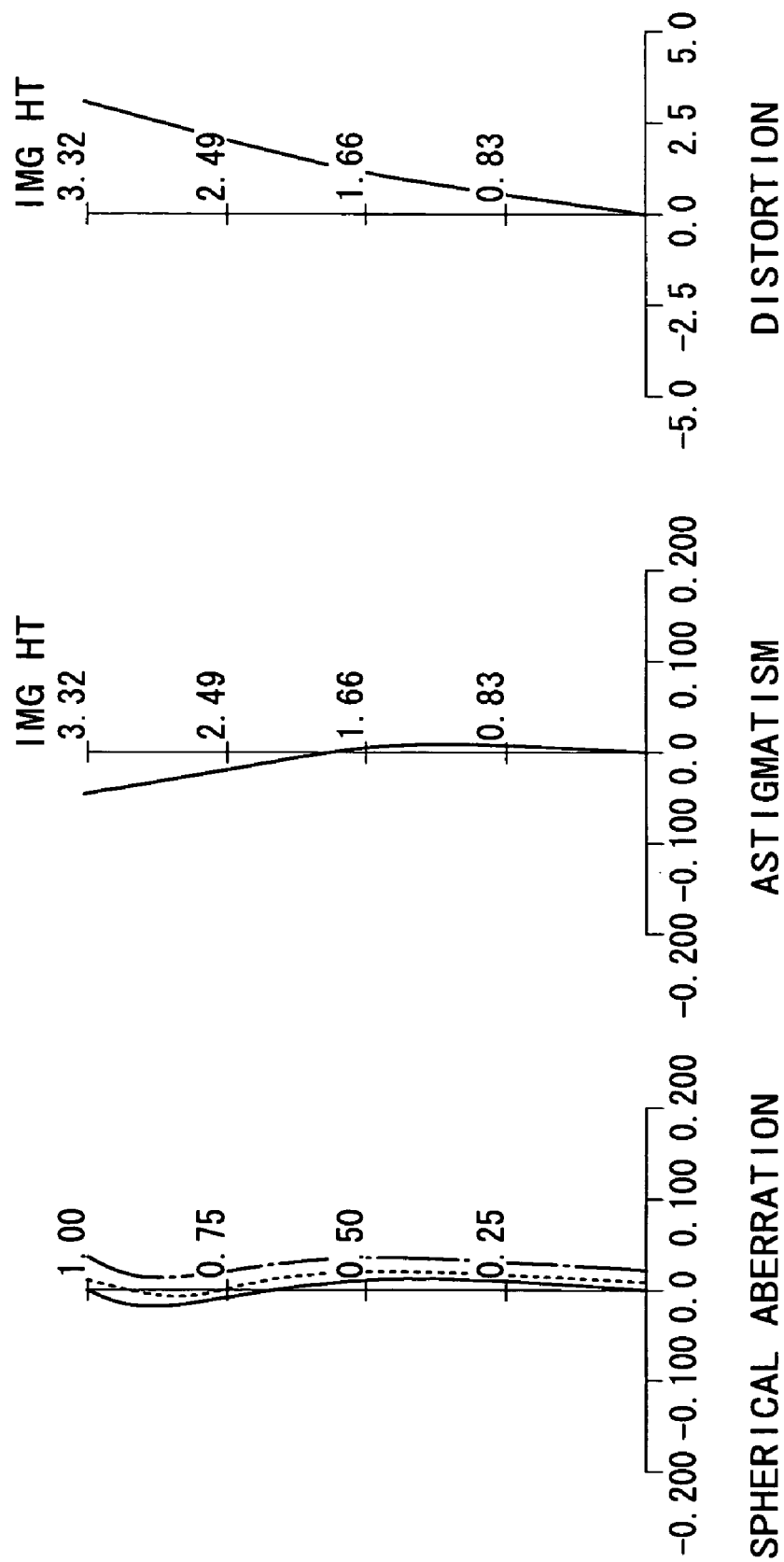
FIG. 12 is a diagram showing aberrations caused by the zoom lens shown in FIG. 9 set in the longest focal length.

FIGS. 10A, 10B and 10C show spherical aberration, astigmatism and distortion, respectively, caused by the zoom lens in the third embodiment set in the shortest focal length. FIGS. 11A, 11B and 11C show spherical aberration, astigmatism and distortion, respectively, caused by the zoom lens in the third embodiment set in a middle shortest focal length. FIGS. 12A, 12B and 12C show spherical aberration, astigmatism and distortion, respectively, caused by the zoom lens in the third embodiment set in the longest focal length. In FIGS. 10A, 11A and 12A, the ratio of spherical aberration to F-number is measured on the vertical axis, deviation from an accurate focus is measured on the horizontal axis, and a continuous line, a broken line and a chain line are for the D line, the C line and the G line, respectively. In FIGS. 10B, 11B and 12B, image height is measured on the vertical axis, focus is measured on the horizontal axis, a continuous line indicates a sagittal image surface, and a broken line indicates a meridional image surface. In FIGS. 10C, 11C and 12C, image height is measured on the vertical axis, and distortion percentage is measured on the horizontal axis.

Table 3 shows data on the zoom lens in the third embodiment.

TABLE 3

Data on Zoom Lens
FNo. = 2.85–3.67–5.15
f = 5.25–8.82–14.86
ω = 33.56–20.42–12.27

| Surface No. | R | D | ND | vd |
|---|---|---|---|---|
| 1: | 43.798 | 0.550 | 1.83500 | 43.000 |
| 2: | 6.071 | 1.597 | | |
| 3: | 114.492 (ASP) | 1.000 | 1.52470 | 56.236 |
| 4: | 17.746 (ASP) | 0.600 | | |
| 5: | 10.860 | 1.800 | 1.84666 | 23.800 |

TABLE 3-continued

Data on Zoom Lens
FNo. = 2.85–3.67–5.15
f = 5.25–8.82–14.86
ω = 33.56–20.42–12.27

| | | | | |
|---|---|---|---|---|
| 6: | 34.943 | 11.274–4.405–0.300 | | |
| 7: | 5.768 (ASP) | 1.985 | 1.52470 | 56.236 |
| 8: | −20.077 (ASP) | 0.100 | | |
| 9: | 5.717 | 1.575 | 1.75500 | 52.300 |
| 10: | −9.506 | 0.500 | 1.68893 | 31.200 |
| 11: | 3.194 | 4.529–8.154–14.286 | | |
| 12: | 32.463 (ASP) | 2.000 | 1.52470 | 56.236 |
| 13: | −10.110 | 1.300 | | |
| 14: | INFINITY | 0.700 | 1.51680 | 64.200 |
| 15: | INFINITY | 0.600 | | |
| 16: | INFINITY | 0.500 | 1.56883 | 56.000 |
| 17: | INFINITY | | | |

| Surface No. | κ | $A^4$ | $A^6$ | $A^8$ | $A^{10}$ |
|---|---|---|---|---|---|
| 3 | 1 | 0.906899E−03 | −0.640632E−04 | 0.435915E−05 | −0.925116E−07 |
| 4 | 1 | 0.572459E−03 | −0.687373E−04 | 0.472822E−05 | −0.121438E−06 |
| 7 | 1 | −0.471918E−03 | 0.227421E−05 | −0.290975E−05 | 0.779030E−06 |
| 8 | 1 | 0.552389E−03 | 0.485357E−05 | −0.180632E−05 | 0.110846E−05 |
| 12 | 1 | −0.910051E−03 | 0.696968E−04 | −0.494248E−05 | 0.135280E−06 |

In Table 3, FNo. denotes F-number, f denotes focal length, ω denotes half field angle, R denotes radius of curvature, D denotes distance between lens surfaces, ND denotes refractive index for the D line, and vd denotes Abbe's number. Surfaces with "(ASP)" are aspheric surfaces. The shape of the aspheric surface is expressed by Expression (1).

Fourth Embodiment

Figure 13:
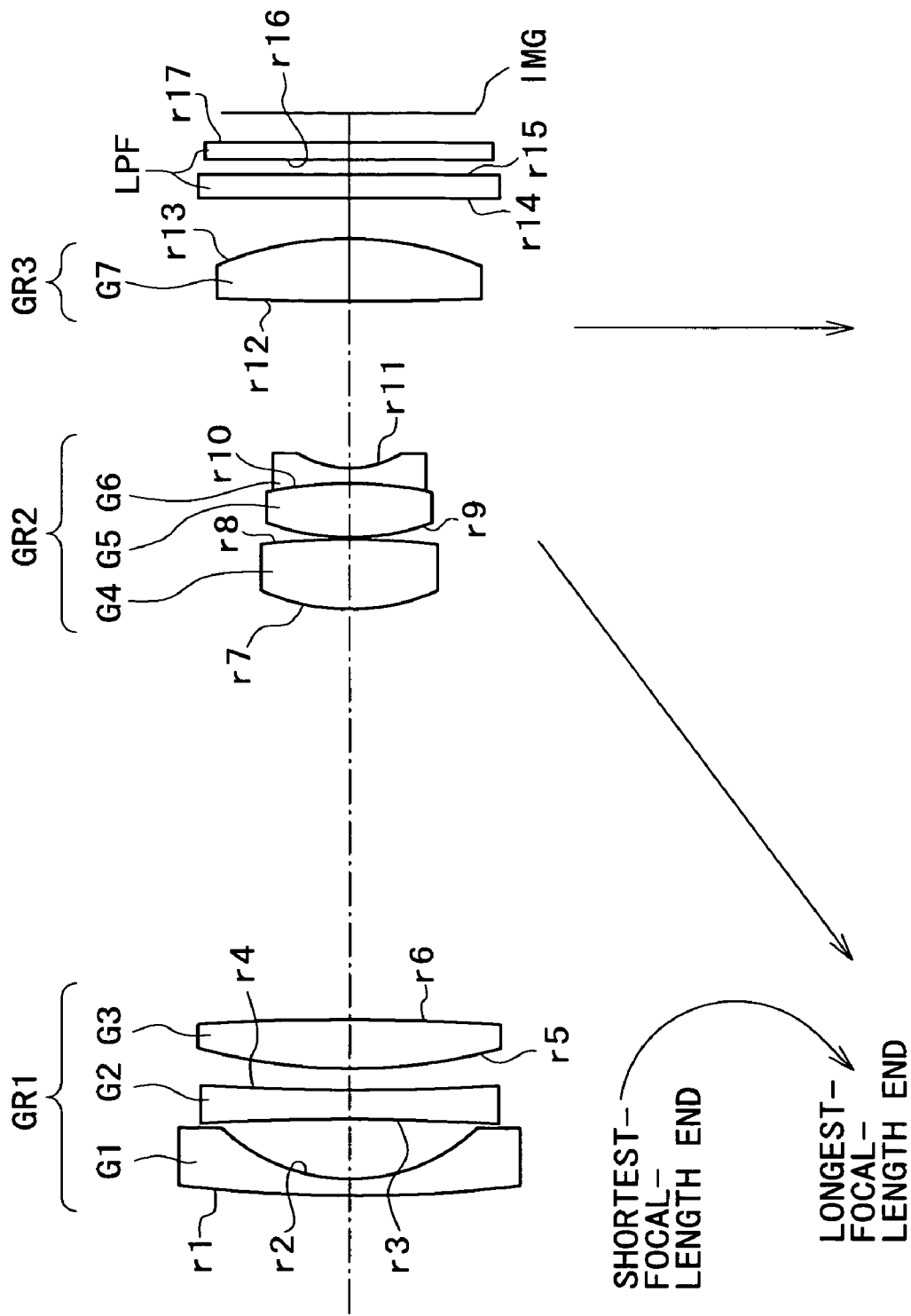
FIG. 13 is a typical sectional view of a zoom lens in a fourth embodiment according to the present invention.

FIG. 13 shows the construction of a zoom lens in a fourth embodiment according to the present invention. Referring to FIG. 13, the zoom lens has a negative first lens group GR1, a positive second lens group GR2 and a positive third lens group GR3 arranged in that order from an object side toward an image side. The first lens group GR1 includes a negative first single lens G1 having a surface having a large curvature and concave toward the image side, a negative second single lens G2 having an aspheric surface facing the image side and formed of a plastic material, and a positive third single lens G3. The second lens group GR2 includes a positive single lens G4 having opposite aspheric surfaces and formed of a plastic material, and a compound lens G5/G6 formed by bonding together a positive single lens G5 and a negative single lens G6. The third lens group GR3 includes a positive single lens G7 having an aspheric surface facing the object side.

FIGS. 14A, 14B and 14C show spherical aberration, astigmatism and distortion, respectively, caused by the zoom lens in the fourth embodiment set in the shortest focal length. FIGS. 15A, 15B and 15C show spherical aberration, astigmatism and distortion, respectively, caused by the zoom lens in the fourth embodiment set in a middle shortest focal length. FIGS. 16A, 16B and 16C show spherical aberration, astigmatism and distortion, respectively, caused by the zoom lens in the fourth embodiment set in the longest focal length. In FIGS. 14A, 15A and 16A, the ratio of spherical aberration to F-number is measured on the vertical axis, deviation from an accurate focus is measured on the horizontal axis, and a continuous line, a broken line and a chain line are for the D line, the C line and the G line, respectively. In FIGS. 14B, 15B and 16B, image height is measured on the vertical axis, focus is measured on the horizontal axis, a continuous line indicates a sagittal image surface, and a broken line indicates a meridional image surface. In FIGS. 14C, 15C and 16C, image height is measured on the vertical axis, and distortion percentage is measured on the horizontal axis.

Table 4 shows data on the zoom lens in the fourth embodiment.

TABLE 4

Data on Zoom Lens
FNo. = 2.85–3.64–4.88
f = 5.25–8.83–14.86
ω = 33.53–20.46–12.27

| Surface No. | R | D | ND | vd |
|---|---|---|---|---|
| 1: | 52.508 | 0.550 | 1.83500 | 43.000 |
| 2: | 6.004 | 1.900 | | |
| 3: | −174.302 | 1.000 | 1.52470 | 56.236 |
| 4: | 26.429 (ASP) | 0.693 | | |
| 5: | 18.281 | 1.608 | 1.84666 | 23.800 |
| 6: | −116.979 | 13.515–5.431–0.600 | | |
| 7: | 6.711 (ASP) | 2.279 | 1.52470 | 56.236 |
| 8: | −25.957 (ASP) | 0.100 | | |
| 9: | 5.875 | 1.771 | 1.77250 | 49.600 |
| 10: | −7.713 | 0.500 | 1.68893 | 31.200 |

TABLE 4-continued

Data on Zoom Lens
FNo. = 2.85–3.64–4.88
f = 5.25–8.83–14.86
ω = 33.53–20.46–12.27

| 11: | 3.361 | 5.500–9.232–15.552 | | |
|---|---|---|---|---|
| 12: | 38.438 (ASP) | 2.000 | 1.52470 | 56.236 |
| 13: | −10.974 | 1.300 | | |
| 14: | INFINITY | 0.700 | 1.51680 | 64.200 |
| 15: | INFINITY | 0.600 | | |
| 16: | INFINITY | 0.500 | 1.56883 | 56.000 |
| 17: | INFINITY | | | |

| Surface No. | κ | $A^4$ | $A^6$ | $A^8$ | $A^{10}$ |
|---|---|---|---|---|---|
| 4 | 1 | −0.417851E−03 | −0.785782E−05 | 0.388494E−06 | −0.233268E−07 |
| 7 | 1 | −0.278892E−03 | −0.110032E−04 | 0.135004E−05 | 0.950839E−07 |
| 8 | 1 | 0.488995E−03 | −0.134588E−04 | 0.255035E−05 | 0.191537E−06 |
| 12 | 1 | −0.810182E−03 | 0.523066E−04 | −0.371469E−05 | 0.106517E−06 |

In Table 4, FNo. denotes F-number, f denotes focal length, ω denotes half field angle, R denotes radius of curvature, D denotes distance between lens surfaces, ND denotes refractive index for the D line, and vd denotes Abbe's number. Surfaces with "(ASP)" are aspheric surfaces. The shape of the aspheric surface is expressed by Expression (1).

Table 5 shows data on the factors specified in Inequalities (1) to (4) of the zoom lenses in the first to the fourth embodiment.

TABLE 5

| Inequalities | First embodiment | Second embodiment | Third embodiment | Fourth embodiment |
|---|---|---|---|---|
| (1) D12/fw | 0.0952 | 0.1002 | 0.0571 | 0.1143 |
| (2) D2G/fw | 0.8447 | 0.9448 | 0.7924 | 0.8857 |
| (3) TLW/fw | 5.7143 | 5.7143 | 6.0190 | 6.7619 |
| (4) D23/fw | 0.8077 | 0.6469 | 0.8626 | 1.0469 |

As obvious from Table 5, the zoom lenses in the first to the fourth embodiment satisfy all the conditions expressed by Inequalities (1) to (4). As obvious from the diagrams showing aberrations, the zoom lenses are capable of evenly correcting all kinds of aberrations.

The plastic lenses of the zoom lenses in the first to the fourth embodiment may be replaced with equivalent glass lenses. Material of the lenses may be selectively decided taking into consideration workability, optical characteristics, weight const and such.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A zoom lens having an optical axis and comprising: a negative first lens group capable of being moved for zooming and disposed nearest to a front end; a positive second lens group capable of being moved for zooming, and disposed behind the first lens group; and a positive third lens group disposed behind the second lens group;

wherein the zoom lens meets conditions expressed by inequalities:

$$02 < D12/fw < 0.13 \quad (1)$$

$$0.5 < D2G/fw < 0.95 \quad (2)$$

$$5 < TLW/fw < 8 \quad (3)$$

where D12 is a minimum distance on the optical axis between a back surface of the first lens group and a front surface of the second lens group, D2G is a distance between front and back surfaces of the second lens group, TLW is optical length of the zoom lens as set in the shortest focal length, and fw is the shortest focal length.

2. The zoom lens according to claim 1, wherein at least one of component lenses of the first, the second and the third lens group is a plastic lens.

3. The zoom lens according to claim 1, wherein the first lens group includes a first lens having a negative refracting power, a second lens having a negative refracting power and formed of a plastic material and a third lens having a positive refracting power; and the second lens of the first lens group has at least one aspheric surface.

4. The zoom lens according to claim 1 further comprising a shading member disposed between the second and the third lens group to reduce the intensity of light reaching an image sensor while the image sensor reads an image signal; and meeting a condition expressed by an inequality:

$$0.5 < D23/fw < 1.1 \quad (4)$$

Where D23 is a minimum distance on the optical axis between the back surface of the second lens group and the front surface of the third lens group, and fw is the shortest focal length.

5. An imaging device comprising: a zoom lens having a plurality of lens groups capable of being moved along an optical axis with respect to each other to obtain a continuously variable magnification; and an image sensor capable converting an optical image formed by the zoom lens into a corresponding electric signal;

wherein the zoom lens comprises: a negative first lens group capable of being moved for zooming and disposed nearest to a front end; a positive second lens group capable of being moved for zooming, and disposed behind the first lens group; and a positive third lens group disposed behind the second lens group; and meets conditions expressed by inequalities:

$$0.02 < D12/fw < 0.13 \tag{1}$$

$$0.5 < D2G/fw < 0.95 \tag{2}$$

$$5 < TLW/fw < 8 \tag{3}$$

where D12 is a minimum distance on the optical axis between a back surface of the first lens group and a front surface of the second lens group, D2G is a distance between front and back surfaces of the second lens group, TLW is optical length of the zoom lens as set in the shortest focal length, and fw is the shortest focal length.

6. The imaging device according to claim 5, wherein at least one of component lenses of the first, the second and the third lens group is a plastic lens.

7. The imaging device according to claim 5, wherein the first lens group includes a first lens having a negative refracting power, a second lens having a negative refracting power and formed of a plastic material and a third lens having a positive refracting power; and the second lens of the first lens group has at least one aspheric surface.

8. The imaging device according to claim 5, wherein the zoom lens further comprises a shading member disposed between the second and the third lens group to reduce the intensity of light reaching an image sensor while the image sensor reads an image signal; and meets a condition expressed by an inequality:

$$0.5 < D23/fw < 1.1 \tag{4}$$

Where D23 is a minimum distance on the optical axis between the back surface of the second lens group and the front surface of the third lens group, and fw is the shortest focal length.

* * * * *